R. J. BOWMAN.
Vehicle Wheel.
No. 83,245. Patented Oct. 20, 1868.
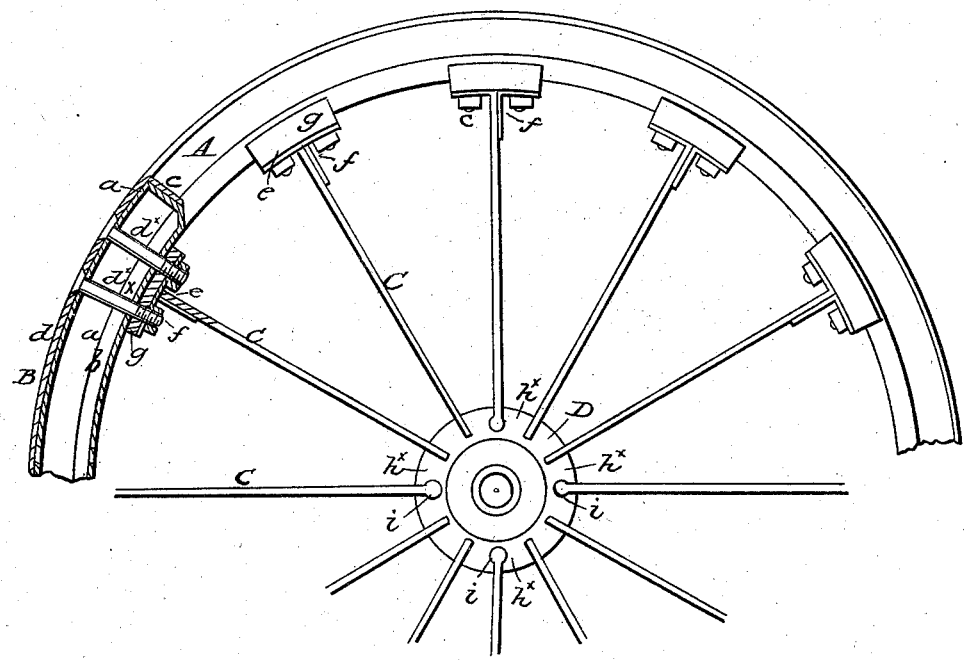
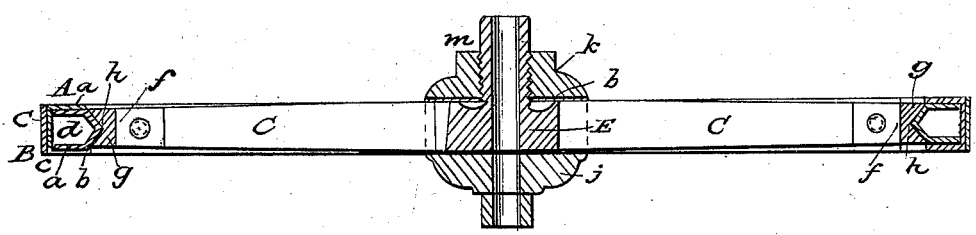
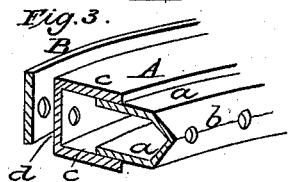

United States Patent Office.

R. J. BOWMAN, OF MANSFIELD, LOUISIANA.

Letters Patent No. 83,245, dated October 20, 1868.

IMPROVEMENT IN WHEEL FOR VEHICLES.

The Schedule referred to in these Letters Patent and making part of the same.

*To all whom it may concern:*

Be it known that I, R. J. BOWMAN, of Mansfield, in the parish of De Soto, and State of Louisiana, have invented a new and useful Improvement in Wheels for Vehicles; and I do hereby declare that the following is a full, clear, and exact description thereof, which will enable those skilled in the art to make and use the same, reference being had to the accompanying drawings, forming a part of this specification.

This invention relates to a new and useful improvement in the construction of metallic wheels for vehicles, whereby strength and lightness are obtained, with a requisite amount of elasticity to avoid the transmission of jars and concussions to the body of the vehicle, and the consequent wear and tear attending the same.

In the accompanying sheet of drawings—

Figure 1 is a side view of a portion of my invention partly in section.

Figure 2, a section of the same taken on the line $x$ $x$, fig. 1.

Figure 3, a perspective view of a portion of the same.

Similar letters of reference indicate corresponding parts.

A represents the rim of the wheel, which rim is a tube composed of two parts, one part having parallel sides, $a$ $a$, and a v-shaped inner side, $b$, as shown clearly in fig. 3. The other part of the rim is composed of two parallel sides, $c$ $c$, and an outer side, $d$, at right angles with $c$ $c$, the latter part being fitted over the former part, as will be understood by referring to fig. 3.

These two parts of the rim may be formed by rolling, pressing, swaging, or in any proper way, and each part may be composed of one or more pieces. If each part be composed of a plurality of pieces, the pieces of the two parts should be so arranged or disposed as to "break joints," as it is technically termed.

The rim is covered with a tire, B, which is secured to the outer part of the rim by bolts $d^\times$, which also secure the outer ends of the spokes C to the rim A.

These spokes are composed of flat metal plates, slightly tapering in width from their inner to their outer ends. The outer parts of the spokes being bent over at right angles with their main portion, as shown at $e$, and an angle-plate, $f$, being placed against the side of each spoke, opposite to the side where the bent part $e$ is formed, the plates $f$ being riveted to the spokes. The plates $f$ and bent parts $e$ of the spokes are placed against metal blocks, $g$, the outer surfaces of which are formed with v-shaped concaves, $h$, as shown in fig. 2, to receive the v-shaped inner surface $b$ of the inner part of the rim, and the bolts $d^\times$ pass through the tire B, and the two parts of the rim A, and the parts $e f$ of the spokes C, securing all said parts together, as will be fully understood by referring to fig. 1.

The inner ends of the spokes C are secured in a ring, D, of metal, having dovetail slots cut radially in it, and the inner ends of the spokes made in dovetail-form to fit into the slots, or radial slots may be made in the ring, with a round hole or chamber, $h^\times$, at their inner ends, to receive a cylindrical key, $i$, formed on the inner ends of the spokes, as shown in fig. 1. This latter plan I consider preferable.

Within this ring, D, the box E of the hub is fitted, said box having a shoulder, $j'$, near one end, to bear against the ring D, a collar, $k$, which is fitted on the box, bearing against a washer, $l$, at the opposite side of the ring, the ring and inner ends of the spokes being firmly clamped between the shoulder and collar or washer, by screwing up the collar, which works on a screw, $m$, on the box. (See fig. 2.)

The sides of the ring D are made slightly tapering, corresponding to the taper of the spokes, and the face-side of the shoulder $j'$, as well as the washer $l$ and collar $k$, is of corresponding taper-form, to effectually prevent any casual withdrawal of the spokes from the ring, or ease any strain to which the cylindrical keys or dovetails at the inner ends of the spokes may be subjected.

A carriage-wheel, constructed as described, will be extremely strong, light, and durable, and will also possess sufficient elasticity to prevent the transmission of jars or concussions to the body of the vehicle, thereby preventing much wear and tear.

The v-shaped inner side $b$ of the rim admits of mud easily slipping off from it.

The great objection to wheels, made exclusively of metal, consisted hitherto in their rigidity or unyielding property, there being no give to them. The axles would soon become worn, and the whole vehicle injured by being racked and strained. They were also heavy, and expensive to manufacture.

These objections, it is believed, are fully obviated by my invention.

Having thus described my invention,

What I claim as new, and desire to secure by Letters Patent, is—

1. The tubular rim A, composed of two parts, constructed and fitted together in the manner substantially as and for the purpose set forth.

2. The flat spokes C, secured to the hollow rim A by means of the bent ends $e$, angle-plates $f$, bolts $d^\times$, and grooved blocks $g$, and to the hub-ring D by means of the cylindrical keys $i$ and chambers $h^\times$, substantially as herein shown and described.

3. The combination of the rim A, tire B, spokes C, and the hub, composed of the ring D, and box E, all constructed and arranged substantially as and for the purpose specified.

R. J. BOWMAN.

Witnesses:
G. W. GRAHAM,
C. R. COLLINS.